United States Patent [19]
Jang et al.

[11] Patent Number: 5,251,018
[45] Date of Patent: Oct. 5, 1993

[54] COLOR SIGNAL CONTOUR COMPENSATOR FOR MATCHING THE RISE TIMES OF COLOR AND LUMINANCE SIGNALS OF A VIDEO SIGNAL TO PRODUCE SHARPER IMAGES

[75] Inventors: Ki-nam Jang; Baek-heui Han, both of Suwon, Rep. of Korea

[73] Assignee: Samsung Electronics Co., Ltd., Rep. of Korea

[21] Appl. No.: 827,771

[22] Filed: Jan. 29, 1992

[30] Foreign Application Priority Data

Jan. 29, 1991 [KR] Rep. of Korea .................. 91-1517

[51] Int. Cl.$^5$ ............................................. H04N 5/208
[52] U.S. Cl. ..................................... 358/37; 358/162; 358/166
[58] Field of Search ....................... 358/37, 162, 166

[56] References Cited

U.S. PATENT DOCUMENTS

| | | | |
|---|---|---|---|
| 3,798,353 | 3/1974 | Illetschko | 358/37 |
| 3,859,544 | 1/1975 | Nero | 358/37 X |
| 4,739,395 | 4/1988 | Juhanndeiter et al. | 358/37 |
| 4,912,551 | 3/1990 | Ozaki | 358/37 |
| 5,038,206 | 8/1991 | Ubukata | 358/37 |

FOREIGN PATENT DOCUMENTS 0198103 10/1986 European Pat. Off. .
0224302 6/1987 European Pat. Off. .
4009730 10/1991 Fed. Rep. of Germany .

*Primary Examiner*—Mark R. Powell
*Attorney, Agent, or Firm*—Sughrue, Mion, Zinn Macpeak & Seas

[57] ABSTRACT

A color signal contour compensator includes an A/D converter, signal processors for processing the digital composite video signal output from the A/D converter into separate color and luminance signals, a color signal rise time compensator for detecting the rise time of the color signal output from the signal processors so as to output a delay control signal, a D/A converter for converting the color signal of the color and luminance signals output from the color signal rise time compensator into an analog signal during a period corresponding to a specific level of the delay control signal output from the color signal rise time compensator, a microcomputer including a memory device for storing a predetermined amplitude absolute value of the color signal, a rise time value of the luminance signal, and a delay value for delaying the luminance and color signals. The compensator matches the rise time of the color signal to the relatively short rise time of the luminance signal, thereby sharpening the contour of a picture during playback and improving the picture quality.

9 Claims, 5 Drawing Sheets

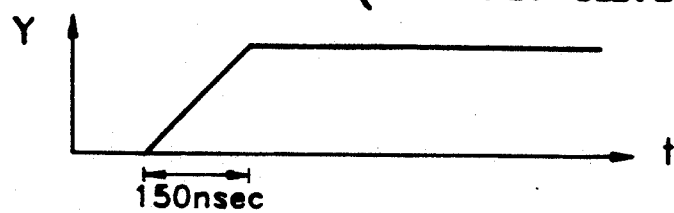
FIG. 2A (PRIOR ART)
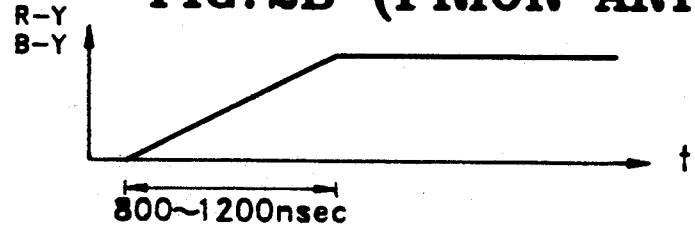
FIG. 2B (PRIOR ART)
FIG. 6A
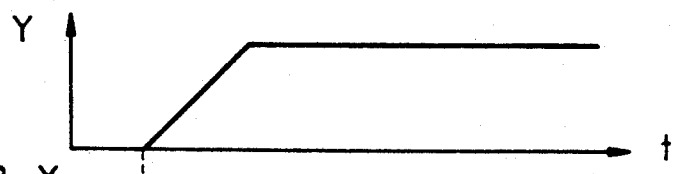
FIG. 6B
FIG. 6C
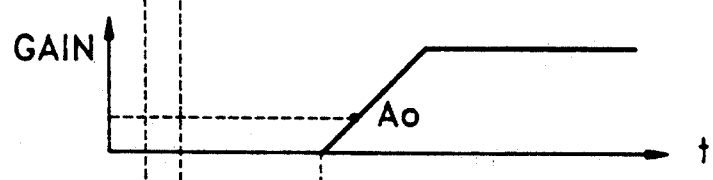
FIG. 6D
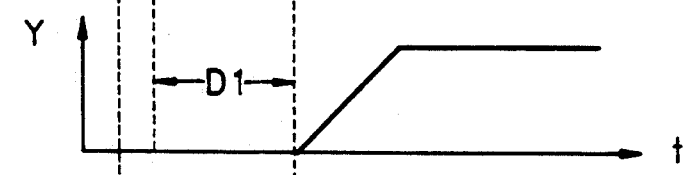
FIG. 6E
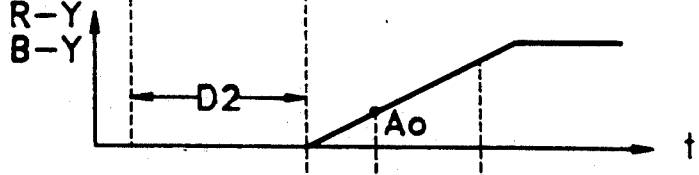
FIG. 6F
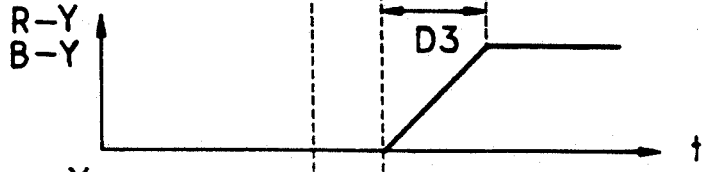
FIG. 6G
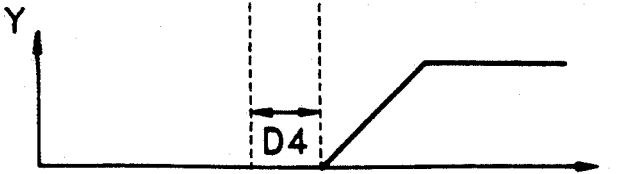

COLOR SIGNAL CONTOUR COMPENSATOR FOR MATCHING THE RISE TIMES OF COLOR AND LUMINANCE SIGNALS OF A VIDEO SIGNAL TO PRODUCE SHARPER IMAGES

FIELD OF THE INVENTION

The present invention relates to a color signal contour compensator in video apparatuses and, more particularly, to a color signal contour compensator for matching the transient time (rise time) of a color signal to the transient time (rise time) of a luminance signal so as to digitally process the contour compensation of the color signal in video apparatuses such as video cassette recorders and televisions.

BACKGROUND OF THE INVENTION

Generally, as shown in FIG. 1, a video signal processor for next generation digital video apparatuses, such as high-resolution digital televisions and high-resolution digital video cassette recorders, converts an analog composite video signal input from an input source (not shown in FIG. 1) into a digital signal in an A/D converter 10. The digital video signal is digitally processed by first and second signal processors 20 and 30 and the digital video signal is output as luminance and color difference signals Y, R-Y and B-Y to a D/A converter 40. D/A converter 40 then converts the luminance and color difference signals into R, G and B analog color signals.

As shown in FIG. 2A, the normal transient rise time (hereinafter referred to as rise time) of luminance signal Y output from first signal processor 20 is about 150 nanoseconds (nsec) while, as shown in FIG. 2B, the rise time of color difference signals R-Y and B-Y output from the second signal processor 30 is about 800 to 1200 nsec.

The frequency bandwidth of a color difference signal is much smaller than that of a luminance signal. In a standard television system, the bandwidth of the color signal is smaller than that of the luminance signal by about a factor of five.

In other words, since the transmission frequency bandwidth of a color subcarrier is relatively narrow and the transient time of the color signal is about 5 times longer, as compared with that of the luminance signal, if the color is abruptly changed, the color edge becomes unclear.

According to the above apparatus, since the rise times of the color difference and luminance signals do not match and the rise time of the color difference signal is far longer than that of the luminance signal, when the digital luminance and color difference signals are converted into analog video signals to be displayed on a display, the sharpness of a picture's edge is reduced, resulting in reduced picture quality.

A circuit for steepening the transient slope of the color signal is disclosed in Japanese Laid-Open Patent Publication SHO 61-244186, which consists of a slope detector, a memory, a switch and a timing controller. Time threshold value and amplitude threshold value signals are supplied to the slope detector so as to steepen the slope of the color signal for operating conditions which are above the amplitude threshold value and below the time threshold value. However, the transient time of the color signal does not always match that of the luminance signal in the above mentioned apparatus.

SUMMARY OF THE INVENTION

Therefore, it is an object of the present invention to provide a color signal contour compensator for digitally processing signals so as to match the rise times of the color and luminance signals using a time delay device.

This and other objects, features and advantages of the present invention are provided by a color signal contour compensator including an input path, through which a composite video signal is provided, signal processors for processing the composite video signal into digital color and luminance signals, a color signal rise time compensator for detecting the rise time of the color signal output from the signal processors and generating a delay control signal of a predetermined level when the rise time of the color signal equals the rise time of the luminance signal at a time point having a predetermined amplitude, a converter for converting the color signal of the color and luminance signals output from the color signal rise time compensator into an analog signal during a period corresponding to an excited level of the delay control signal so as to output the color and luminance signals as analog red, green and blue signals, a controller for supplying a predetermined amplitude absolute value of the color signal, a rise time value of the luminance signal detected by the second signal processor, and delay data for delaying transmission of the luminance and color signals to the color signal rise time compensator for a predetermined period.

BRIEF DESCRIPTION OF THE DRAWINGS

The above object and other advantages of the present invention will become more apparent by describing in detail a preferred embodiment of the present invention with reference to the attached drawings, in which:

FIGS. 2A and 2B illustrate the operational waveforms of the digital video signal processor of FIG. 1;

FIGS. 6A through 6G illustrate the operational waveforms of the color signal rise time compensator of FIG. 4.

DETAILED DESCRIPTION OF PREFERRED EMBODIMENTS

Figure 1:
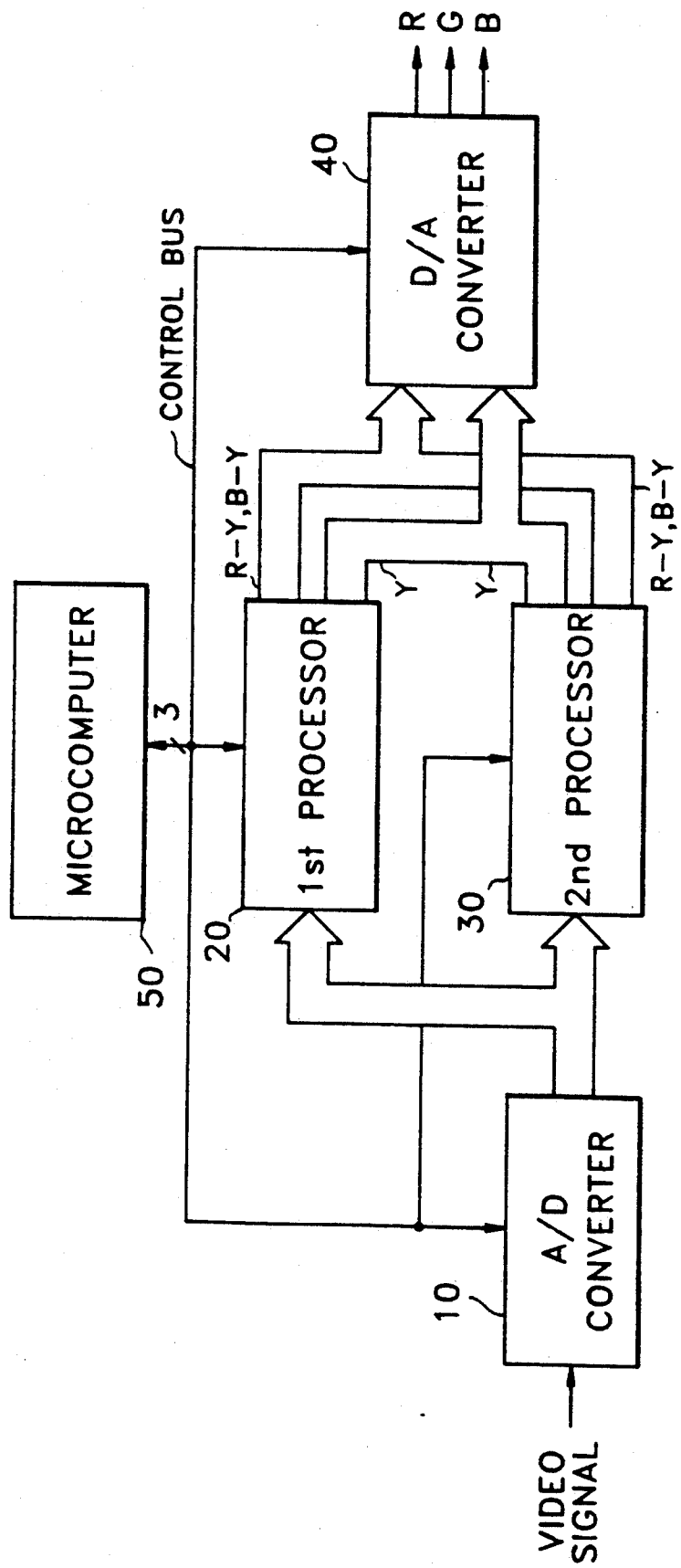
FIG. 1 is a block diagram of a conventional digital video signal processor.
Figure 3:
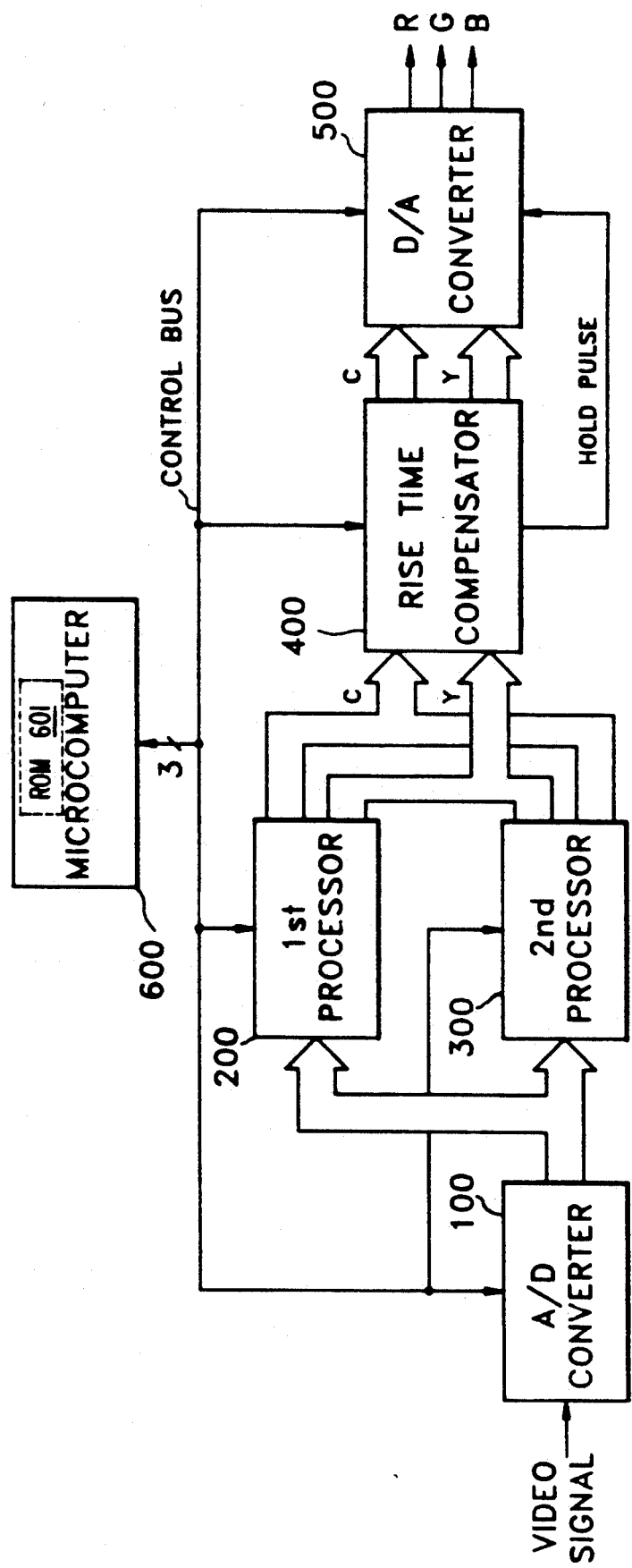
FIG. 3 is a block diagram of one embodiment of the color signal contour compensator of the present invention.

Referring to FIG. 3, an A/D converter 100 converts a composite video signal input from a not-shown signal input source into a digital signal according to an A/D clock signal output from a microcomputer 600 via a control bus line.

Signal processors 200 and 300 convert the digital composite vide signal into luminance and color signals Y and C.

Figure 4:
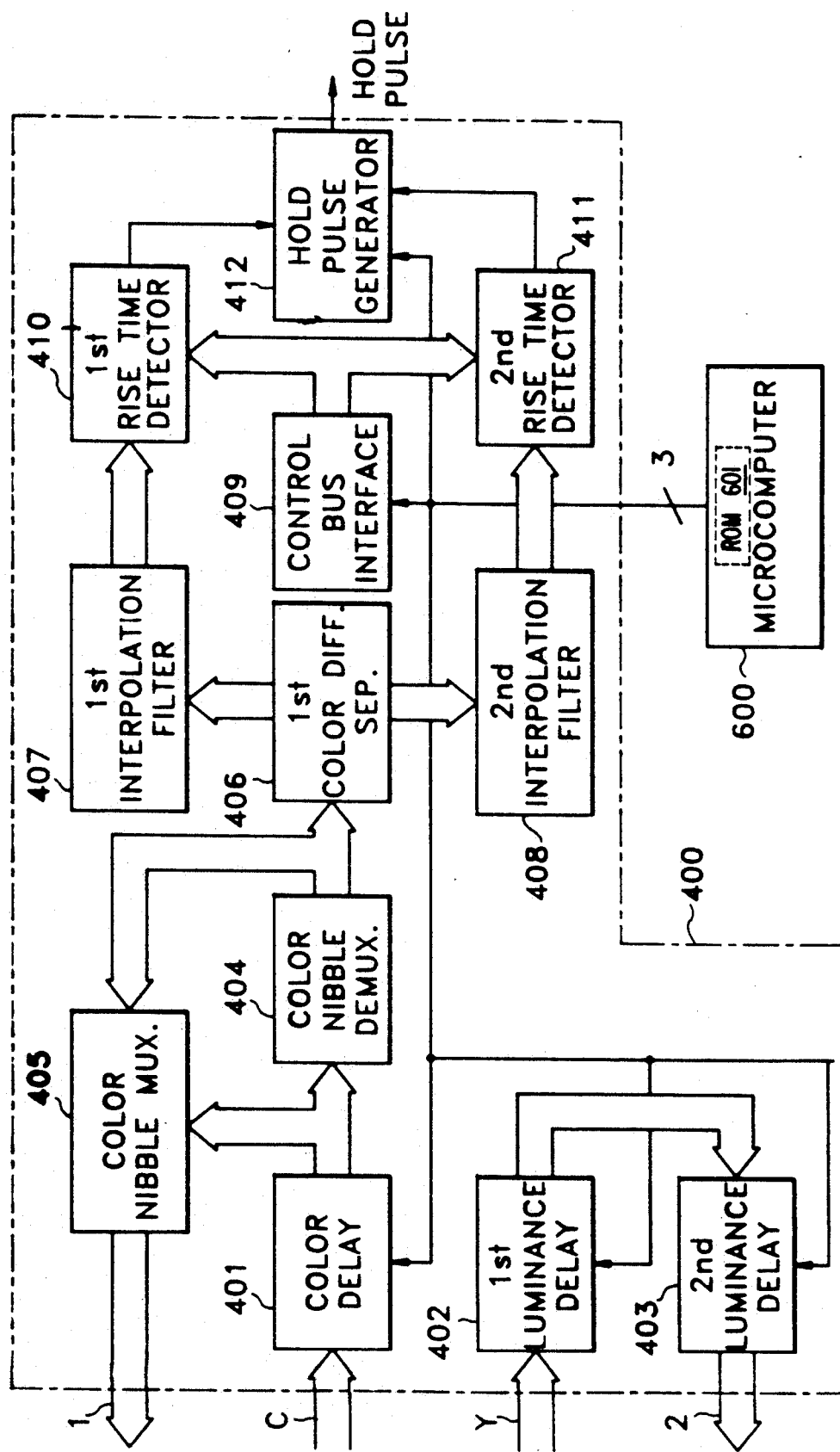
FIG. 4 is a detailed block diagram of the color signal rise time compensator of FIG. 3.

A color signal rise time compensator 400, as illustrated in FIG. 4, comprises a color signal delay circuit 401 and a first luminance signal delay circuit 402 for delaying the color signal and luminance signal, respectively, output from signal processors 200 and 300 for corresponding periods according to delay data transmitted from microcomputer 600 via a control bus line, using a time delay device such as a shift register. Compensator 400 also includes a second luminance signal delay circuit 403 for re-delaying the once delayed luminance signal output from first luminance signal delay circuit 402 for a predetermined period, a color signal nibble demultiplexer 404 for converting the four-bit color signal output from color signal delay circuit 401 into an eight-bit signal, a color signal nibble multiplexer 405 receiving the four-bit color signal output from color signal delay circuit 401 and the eight-bit color signal output from color signal nibble demultiplexer 404 for converting them into a four-bit color signal, a first color difference signal separator 406 consisting of a demultiplexer which separates the eight-bit color signal C output from color signal nibble demultiplexer 404 into color difference signals R-Y and B-Y, R-Y and B-Y. Preferably, compensator 400 further includes interpolation filters 407 and 408 for converting the eight-bit color difference signals R-Y and B-Y into ten-bit color difference signals, a control bus interface 409 for providing an amplitude absolute value transmitted from microcomputer 600 via the three-bit control bus line to first and second rise time detectors 410 and 411 as a seven-bit signal, first and second rise time detectors 410 and 411, each consisting of a digital comparator for comparing the amplitude absolute value output from control bus interface 409 with the amplitudes of color difference signals R-Y and B-Y output from R-Y and B-Y interpolation filters 407 and 408, and a hold pulse generator 412 for generating a HOLD PULSE signal according to the output from first and second rise time detectors 410 and 411.

Figure 5:
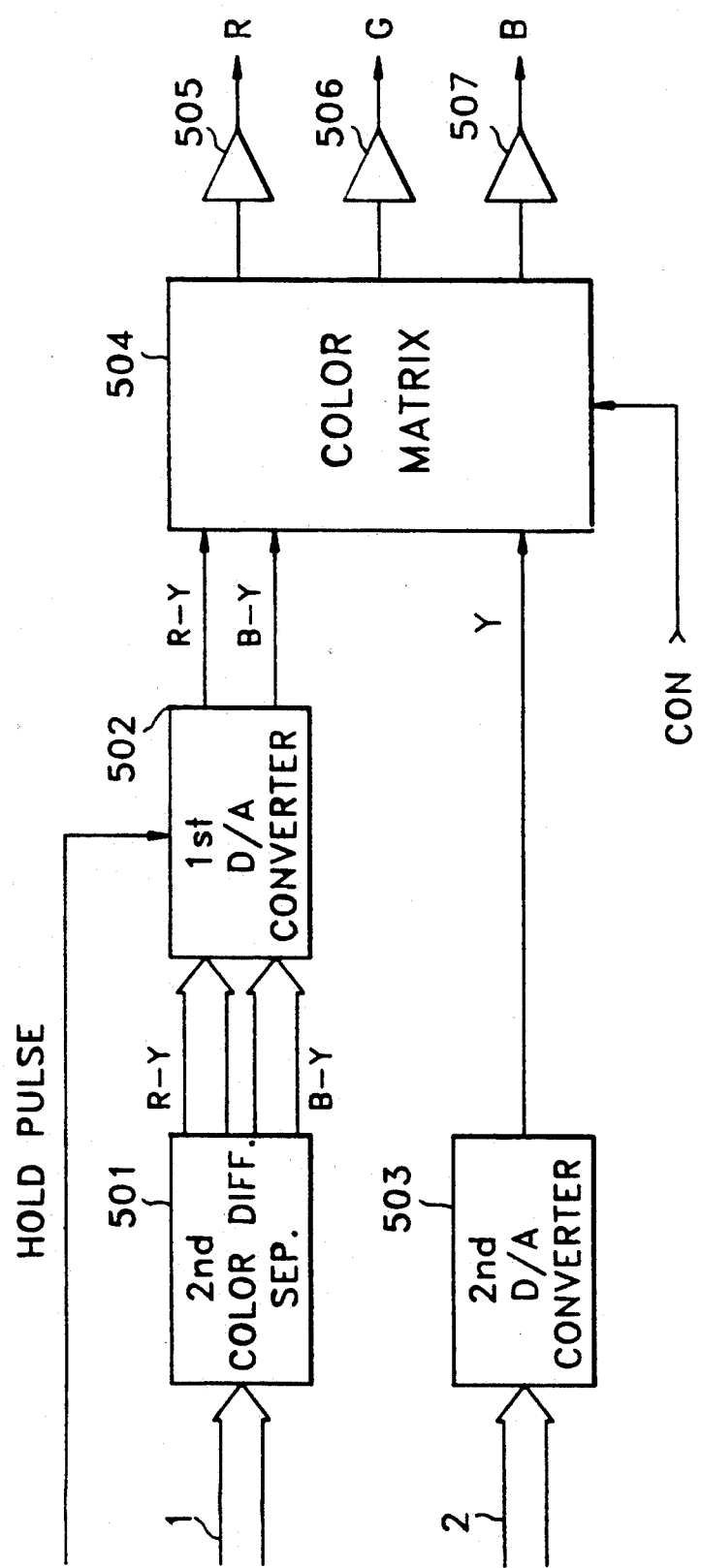
FIG. 5 is a block diagram of the D/A converter of FIG. 3.

D/A converter unit 500, as illustrated in FIG. 5, comprises a second color difference signal separator 501 coupled to an output 1 of color signal nibble multiplexer 405 of color signal rise time compensator 400 for separating the color signal output from color signal nibble multiplexer 405 into color difference signals R-Y and B-Y, a first D/A converter 502 for converting the color signals R-Y and B-Y output from second color difference signal separator 501 into analog color difference signals R-Y and B-Y in response to the hold pulse signal output from hold pulse generator 412, a second D/A converter 503, coupled to an output 2 of second luminance signal delay circuit 403 of color signal rise time compensator 400, for converting the digital luminance signal Y into an analog luminance signal, a color matrix 504 for separating the luminance and color difference signals output from first and second D/A converters 502 and 503 into analog R, G, and B color signals according to a control signal CON output from microcomputer 600, and first, second and third amplifiers 505, 506 and 507 for amplifying the R, G and B color signals output from color matrix 504 and providing them to a not-shown display.

Microcomputer 600 controls the entire system, stores delay data for controlling the delay of the color and luminance signals as well as the rise time of the luminance signal in a built-in ROM 601, and supplies them to color signal rise time compensator 400. It will be appreciated that ROM 601 advantageously can be located outside of, but controlled from, microcomputer 600 so that the delay data and the rise time of the luminance signal are supplied to color signal rise time compensator 400.

Operation of the color signal contour compensator of the present invention will now be described while referring to the waveforms shown in FIGS. 6A through 6G. As shown in FIG. 3, a digital composite signal output from A/D converter 100 is processed in processors 200 and 300, and output as a color signal C and a luminance signal Y.

As shown in FIGS. 6A and 6B, the normal rise time of luminance signal Y is much shorter, about 150 nsec, than the normal rise time of color signal C, which is about 800 to 1200 nsec. As shown in FIG. 4, color signal C is input to color signal delay circuit 401, and luminance signal Y is input to first luminance signal delay circuit 402.

Color signal delay circuit 401 and first luminance signal delay circuit 402 delay luminance signal Y and color signal C by "D1" and "D2", respectively, to output signals having the waveforms shown in FIGS. 6D and 6E. Here, the delay data corresponding to "D1" and "D2" are determined by data stored in ROM 601 of microcomputer 600 and transmitted via the control bus line.

The color signal delayed by color signal delay circuit 401 is output to color signal nibble demultiplexer 404 and color signal nibble multiplexer 405. The four-bit output signal from color signal nibble multiplexer 405 is input to second color difference separator 501 of D/A converter unit 500, and the eight-bit output signal from color signal nibble demultiplexer 404 is input to color signal nibble multiplexer 405 and first color difference signal separator 406.

The eight-bit color difference signal R-Y separated by first color difference signal separator 406 is converted into a ten-bit signal by first interpolation filter 407 and output to first rise time detector 410 while the eight-bit color difference signal B-Y is converted into a ten-bit signal by second interpolation filter 408 and output to second rise time detector 411.

First and second rise time detectors 410 and 411 compare the amplitude absolute value Ao of FIG. 6C stored in ROM 601 and input through control bus interface 409 with the amplitude gains of the color difference signals R-Y and B-Y output from first and second interpolation filters 407 and 408. When the amplitude gains of the color difference signals are above amplitude absolute value Ao, a "HIGH" logic signal is output, and when the gains are below the absolute value, a "LOW" logic signal is output. When the amplitude gains of the signals output from first and second rise time detectors 410 and 411 are above amplitude absolute value Ao, hold pulse generator 412 generates a "HIGH" logic start pulse for delaying color difference signals R-Y and B-Y by "D3" in FIG. 6F according to the delay data output from microcomputer 600 and transmitted via the control bus line. When the amplitude gains of color difference signals R-Y and B-Y are below amplitude absolute value Ao, hold pulse generator 412 generates a "LOW" logic stop pulse. The delay period corresponding to "D3" is the rise time of the luminance signal. The start and stop pulses output from hold pulse generator 412 are input to the control port of first D/A converter 502 of D/A converter unit 500 so that color difference signals R-Y and B-Y are D/A-converted only during the start pulse period (the rise time of the luminance signal). During the stop pulse period, the color difference signals are not D/A-converted.

In other words, the waveform shown in FIG. 6F is a waveform of the color difference signal output from first D/A converter 502 after the D/A converting operation of color difference signals R-Y and B-Y is controlled by the start and stop pulses output from hold pulse generator 412. It will be apparent that the output signal (FIG. 6E) of color signal delay circuit 401 is D/A-converted above amplitude absolute value Ao. Meanwhile, the delayed luminance signal (FIG. 6D) output from first luminance signal delay circuit 402 is further delayed for a period "D4", as shown in FIG. 6G, by second luminance signal delay circuit 403 and fed to second D/A converter 503. In other words, the waveform shown in FIG. 6G is the signal output from second luminance signal delay circuit 403 and delayed, with respect to the luminance signal (FIG. 6D), for a period "D4", which period corresponds to the stop pulse period of the hold pulse to match its rise time to that of the color difference signal shown in FIG. 6F. here, start period "D3" and stop period "D4" may be selected according to the Tables 1 and 2, which illustrate ranges of clock periods stored in ROM 601 of microcomputer 600.

TABLE 1

| BITS | | | | CLOCK |
|---|---|---|---|---|
| 3 | 2 | 1 | 0 | PERIOD |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

TABLE 2

| BITS | | | | CLOCK |
|---|---|---|---|---|
| 7 | 6 | 5 | 4 | PERIOD |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

The start periods of the hold pulse shown in Table 1 are stored in four lower-order bits of ROM 601, and the stop periods of the hold pulse shown in TABLE 2 are stored in four upper-order bits of ROM 601.

As described in detail above, the color signal contour compensator matches the rise time of a color signal to the relatively short rise time of a luminance signal using a time delay device, thereby sharpening the contour of a picture during playback and preventing the deterioration of picture quality.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A color signal contour compensator comprising:

an input path through which a composite video signal including a color signal and a luminance signal is input;

signal processor means for processing the composite video signal input from said input path into a digital color signal and a digital luminance signal;

color signal rise time compensator means for detecting a rise time of the digital color signal output from said signal processor means so as to output a delay control signal in response to a comparison of an amplitude of said digital color signal with a predetermined amplitude indicating when the rise time of the digital color signal equals a rise time of the digital luminance signal;

converter means for converting the digital color signal and the digital luminance signal output from said color signal rise time compensator means into analog signals, wherein the digital color signal is converted into an analog signal at a time determined by the delay control signal output from said color signal rise time compensator means, so as to output the digital color signal and the digital luminance signal as analog red, green and blue signals; and controller means for controlling said signal processor means, said color signal rise time compensator means and said converter means and for supplying said predetermined amplitude, a rise time value of the digital luminance signal, and delay values for delaying the digital luminance signal and the digital color signal for respective predetermined periods of time to said color signal rise time compensator means.

2. The color signal contour compensator as claimed in claim 1, wherein said color signal rise time compensator means comprises:

first and second delay means for delaying the digital color signal and the digital luminance signal, respectively, a produce a delayed color signal and a delayed luminance signal according to delay data from said controller means so as to match the rise time of the digital color signal with the rise time of the digital luminance signal;

color difference signal separator means for separating the delayed color signal output from said first delay means into color difference signals;

first and second color difference signal rise time detector means for comparing an amplitude of each of the color difference signals output from said color difference signal separator means with the predetermined amplitude output from said controller means hold pulse generator means for supplying a start pulse signal indicating a start pulse period and a stop pulse signal indicating a stop pulse period to said converter means in response to outputs of said first and second color difference rise time detector means; and third delay means for delaying the delayed luminance signal output from said second delay means during the stop pulse period.

3. The color signal contour compensator as claimed in claim 2, wherein said converter means does not convert the delayed color signal during the stop pulse period but converts the delayed color signal only during the start pulse period.

4. The color signal contour compensator as claimed in claim 2, wherein the start pulse period indicate by said hold pulse generator means equals the rise time of the digital luminance signal.

5. The color signal contour compensator as claimed in claim 1, wherein said controller means comprises a ROM for storing said predetermined amplitude, a rise time value of the digital luminance signal, and at least one delay value for delaying the digital luminance signal and the digital color signal.

6. A video apparatus having a microcomputer for controlling the video apparatus, said video apparatus further including a color signal contour compensator which comprises:
- A/D converter means for converting an input composite video signal into a digital composite video signal;
- signal processor means for processing the digital composite video signal output form said A/D converter means to separate the digital composite video signal into a digital color signal and a digital luminance signal;
- storage means for storing a predetermined amplitude a rise time value of the digital luminance signal, and delay values for delaying the digital luminance signal and the digital color signal for predetermined periods, respectively;
- color signal rise time compensator means for delaying the digital color signal and the digital luminance signal output from said signal processor means according to delay data stored in said storage means, and generating a delay control signal in response to a comparison of an amplitude of the digital color signal with the predetermined amplitude indicating when a rise time of the color signal equals a rise time of the digital luminance signal; and
- D/A converter means for converting the digital color signal and the digital luminance signal output from said color signal rise time compensator means into analog signals to be output as red, green and blue signals, the digital color signal being converted into an analog signal during a period indicated by the delay control signal output from said color signal rise time compensator means.

7. The color signal contour compensator as claimed in claim 6, wherein said color signal rise time compensator means comprises:
- first and second delay means for delaying the digital color signal and the digital luminance signal output from said signal processor means according to the delay data of said storage means so as to match the rise time of the digital color signal with the rise time of the digital luminance signal;
- color difference signal separator means for separating the digital color signal output from said first delay means into color difference signals;
- first and second color difference signal rise time detector means for comparing an amplitude of each of the color difference signals output from said color difference signal separator means with the predetermined amplitude stored in said storage means;
- hold pulse generator means for supplying a start pulse signal indicating a start pulse period and a stop pulse signal indicating a stop pulse period to said D/A converter means according to values output by said first and second color difference rise time detector means; and
- third delay means for delaying the digital luminance signal output from said second delay means during said stop pulse period.

8. The color signal contour compensator as claimed in claim 7, wherein said convert means does not D/A-convert the digital color signal during said stop pulse period converts the digital color signal only during said start pulse period.

9. The color signal contour compensator as claimed in claim 7, wherein said start pulse period equals the rise time of the digital luminance signal.

* * * * *